Patented May 3, 1932

1,856,731

UNITED STATES PATENT OFFICE

WILLIAM SEGUINE, JR., OF NEWPORT, DELAWARE, ASSIGNOR, BY MESNE ASSIGNMENTS, TO KREBS PIGMENT & COLOR CORPORATION, OF WILMINGTON, DELAWARE, A CORPORATION OF DELAWARE

PURIFICATION OF ZINC SOLUTIONS

No Drawing. Application filed August 20, 1929. Serial No. 387,271.

This invention relates to the manufacture of lithopone. More particularly it relates to the preparation of the zinc constituents of lithopone. Still more particularly it relates to the removal of nickel impurities from zinc sulfate solutions.

It is known in the prior art that nickel can be removed from zinc sulfate solutions by the use of a large amount of zinc dust and a long period of treatment at a temperature near the boiling point. The disadvantages of this procedure lie in that large quantities of expensive zinc dust are necessary and that long periods of time are required to secure nickel precipitation.

It is further known in the prior art that the use of copper in the solution affects the removal of nickel. The main objection to this procedure is the length of time required and the quantity of zinc dust still necessary. It is also known that a mercury salt may be substituted for the copper and that improved results are obtained. This process, however, has the disadvantage that mercury salts are extremely expensive.

This invention has as an object the removal of nickel from zinc sulfate solution by a new and improved method which will expedite the reaction and obviate the necessity of using expensive mercury salts and excessive amounts of zinc.

These objects are accomplished by the following invention which consists, broadly, in using a tin salt in the solution.

In practicing my invention, I heat the zinc sulfate solution in the presence of zinc dust and add thereto a quantity of a soluble tin salt, for example, stannous chloride. The solution is then stirred and the nickel precipitated out. The solution after decanting and filtering from the zinc residue is found free from nickel.

It has been found that, using stannous chloride, better results were obtained than with the prior art processes, the use of the same amount of tin as copper secures the precipitation in approximately half the time and the use of one-half as much tin secures a slightly speedier precipitation than double its amount of copper sulfate.

I am able to use tin wastes and tin residues from the various manufacturing processes in this operation. These with slight treatment will give a suitable tin salt at very slight expense.

It has been found that the addition of copper sulfate to stannous chloride does not assist the action of the stannous chloride. It will be apparent that the invention is susceptible of wide variations in the salts used, in the heat to which the solution is raised, in the concentration of the solution, etc. The invention is not, therefore, to be deemed limited except as by the appended claims.

It will be apparent that this method of purifying zinc solutions is not limited to the lithopone art or to zinc sulfate solutions, but can be applied with equal facility to the purification of any zinc solution.

I claim:

1. Process for the purification of solutions of zinc sulphate from nickel, which comprises heating the solution in the presence of zinc dust and stannous chloride.

2. Process for the purification of solutions of zinc sulphate from nickel, which comprises adding zinc dust and stannous chloride to the solution, heating, and agitating.

In testimony whereof, I affix my signature.

WILLIAM SEGUINE, JR.